United States Patent [19]

Crippin

[11] Patent Number: 4,872,518
[45] Date of Patent: Oct. 10, 1989

[54] POWER CHAINSAW-ICE AUGER CONVERSION APPARATUS

[76] Inventor: Albert B. Crippin, Rte. #1 Percy Rd., Shingleton, Mich. 49884

[21] Appl. No.: 230,523

[22] Filed: Aug. 10, 1988

[51] Int. Cl.$^4$ .............................. B25F 3/00; F25C 5/04
[52] U.S. Cl. .......................................... 175/18; 30/122; 144/1 F; 144/35 A; 175/87; 384/453; 408/20
[58] Field of Search ............................ 175/18, 87, 394; 408/20, 124, 126; 30/122; 173/29; 144/1 E, 1 F, 35 R, 35 A; 29/560; 384/452, 453, 454, 455

[56] References Cited

U.S. PATENT DOCUMENTS

| | | | |
|---|---|---|---|
| 2,526,131 | 10/1950 | Harnish et al. | 144/35 A X |
| 2,783,794 | 3/1957 | Kroll | 144/35 A |
| 2,846,192 | 8/1958 | Ostling | 175/18 |
| 3,025,917 | 3/1962 | Knoblauch | 175/18 |
| 3,096,832 | 7/1963 | Westre | 175/18 |
| 3,198,266 | 8/1965 | Mishler | 175/18 |
| 3,731,751 | 5/1973 | Rusco | 173/26 |
| 3,736,991 | 6/1973 | Maine | 408/20 X |
| 4,487,271 | 12/1984 | Pomeroy et al. | 144/35 A X |
| 4,603,715 | 8/1986 | Muehlhauser | 144/1 F |

*Primary Examiner*—Stephen J. Novosad
*Assistant Examiner*—David J. Bagnell
*Attorney, Agent, or Firm*—Leon Gilden

[57] ABSTRACT

A conversion apparatus for use in combination with a chain saw is set forth wherein a housing includes a rotatable shaft for attachment of a left-hand helical flight ice auger wherein the shaft includes a plurality of bearings secured within either side of the housing with the shaft extending through the housing and formed with a sprocket housing for mating engagement with the chain saw sprocket. A depending extension of the housing includes a plurality of through extending apertures for accepting a plurality of spaced threaded connectors associated with a chain saw.

2 Claims, 1 Drawing Sheet

U.S. Patent        Oct. 10, 1989        4,872,518
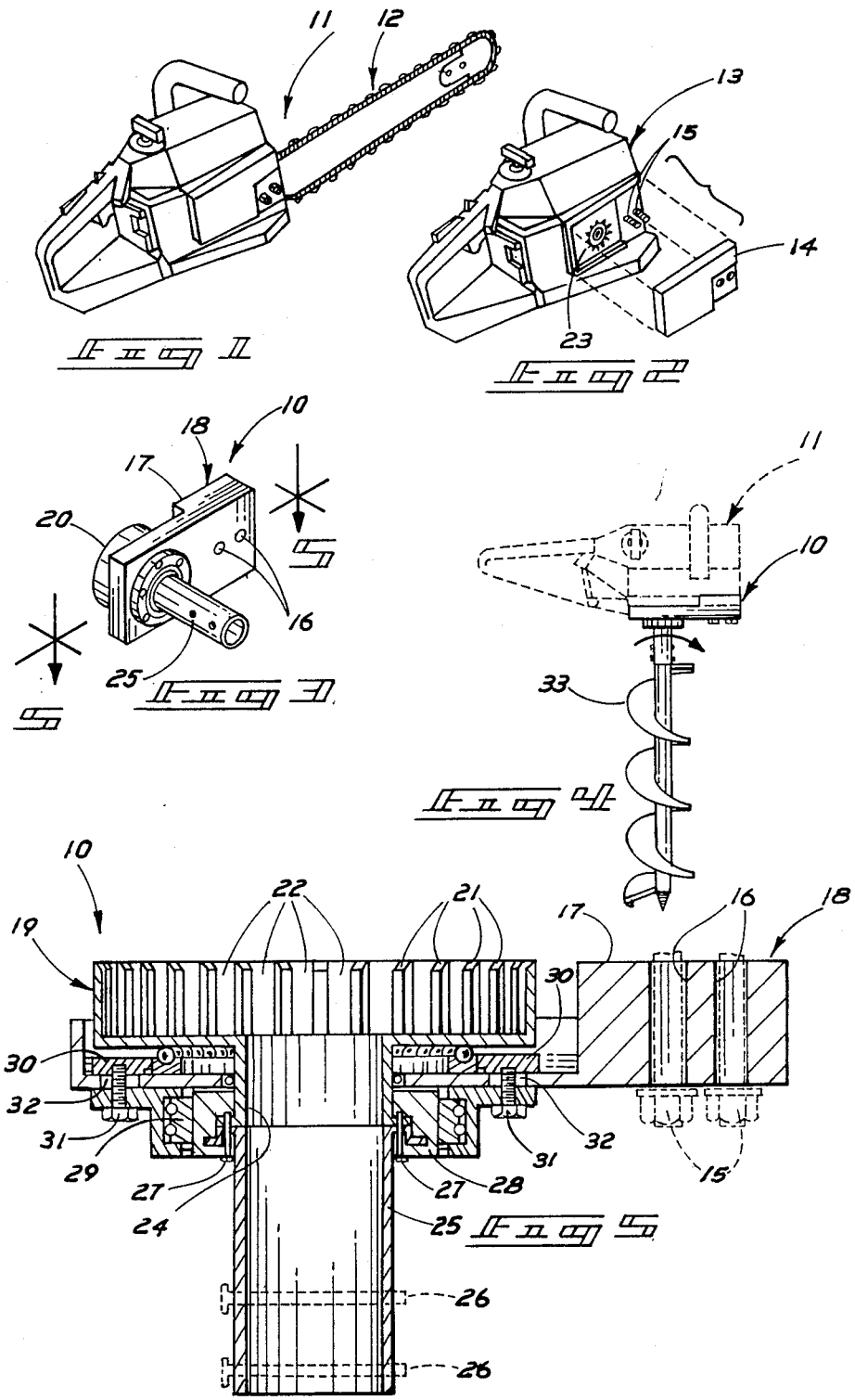

POWER CHAINSAW-ICE AUGER CONVERSION APPARATUS

BACKGROUND OF THE INVENTION

1. Field of the Invention

The field of invention relates to ice augers, and more particularly relates to a new and improved power chain saw ice auger conversion apparatus that enables the utilization of a chain saw as an ice auger, as conventionally utilized in ice fishing.

2. Description of the Prior Art

The use of ice augers is well known in the prior art. Conventionally, sportsmen and the like will auger through the ice for access to fishing therebelow. The ice augers of the past, however, have been of specialized construction removing their application and use by many individuals unwilling or unable to bear the cost of specialized equipment and storage of same when not in use. For example, U.S. Pat. No. 2,846,192 to Ostling sets forth a conventional ice auger formed with a coaxially aligned gasoline powered engine secured to a depending shaft accepting a conventional right-hand auger.

U.S. Pat. No. 3,025,917 to Knoblauch sets forth an ice drill utilizing an electric motor coaxially aligned, as is conventional in the prior art, with the auger or drill construction.

U.S. Pat. No. 3,096,832 to Westre sets forth a variation in ice cutting apparatus utilizing a cylindrical shaft provided with a conventional right-hand drill for cutting through ice for fishing therebelow.

U.S. Pat No. 3,176,784 to Nezzle sets forth an ice cutting apparatus secured to a carriage of expansive and cumbersome organization relatively remote from that of the instant invention.

U.S. Pat. No. 3,198,266 to Mishler sets forth a portable electrically powered ice cutting drill formed with a plurality of cutting blades utilizing grooves milled in their undersides to cut through desired ice layers.

U.S. Pat. No. 3,731,751 to Rusco sets forth an ice auger utilizing a shaft coupled by universal joints and therethrough to a snowmobile to utilize power from the snowmobile to actuate the auger by use of an elongate shaft from the snowmobile and through a gear coupling to a downward depending ice auger of right-hand helical cutting teeth.

As such, it may be appreciated that there continues to exist a need for a new and improved ice auger that is conveniently, readily, and effectively associated with a conventional chain saw drive for conversion to an ice auger unit.

SUMMARY OF THE INVENTION

In view of the foregoing disadvantages inherent in the known types of ice augers now present in the prior art, the present invention provides a power chain saw ice auger conversion apparatus that is selectively and efficiently associated with a chain saw for conversion of the chain saw to an ice auger cutting apparatus. As such, the general purpose of the present invention, which will be described subsequently in greater detail, is to provide a new and improved power chain saw ice auger conversion apparatus which has all the advantages of the prior art ice augers and none of the disadvantages.

To attain this, the present invention comprises a housing formed with a rotatable ice auger drive rotatably mounted therethrough with one end formed as a cup-shaped housing provided with internal gear teeth operatively associated with a gear drive of a chain saw with a second end of the drive extending through the opposite side of the housing for accepting an ice auger shaft thereon. The housing includes an extending flange offset from the drive for mounting to the chain saw.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved power chain saw ice auger conversion apparatus which has all the advantages of the prior art ice augers and none of the disadvantages.

It is another object of the present invention to provide a new and improved power chain saw ice auger conversion apparatus which may be easily and efficiently manufactured and marketed.

It is a further object of the present invention to provide a new and improved power chain saw ice auger conversion apparatus which is of a durable and reliable construction.

An even further object of the present invention is to provide a new and improved power chain saw ice auger conversion apparatus which is susceptible of a low cost of manufacture with regard to both materials and labor, and which accordingly is then susceptible of low prices of sale to the consuming public, thereby making such power chain saw ice auger conversion apparatus economically available to the buying public.

Still yet another object of the present invention is to provide a new and improved power chain saw ice auger conversion apparatus which provides in the apparatuses and methods of the prior art some of the advantages thereof, while simultaneously overcoming some of the disadvantages normally associated therewith.

Still another object of the present invention is to provide a new and improved power chain saw ice auger conversion apparatus that is compactly stored when not in use and readily and efficiently secured to a chain saw for use when desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a conventional chain saw.

FIG. 2 is an isometric illustration of the conventional of FIG. 1 with the drive shield removed.

FIG. 3 is an isometric illustration of the instant invention.

FIG. 4 is an orthographic top plan view of the instant invention with the ice auger secured thereto.

FIG. 5 is an orthographic somewhat enlarged taken along the lines 5—5 of FIG. 3 in the direction indicated by the arrows.

DESCRIPTION OF THE PREFERRED EMBODIMENT

With reference now to the drawings, and in particular to FIGS. 1 to 5 thereof, a new and improved power chain saw ice auger conversion apparatus embodying the principles and concepts of the present invention and generally designated by the reference numeral 10 will be described.

More specifically, the power chain saw ice auger conversion apparatus 10, as illustrated in FIG. 3, is utilized in combination with a chain saw 11 upon removal of the bar and chain assembly 12, as illustrated in FIG. 1. Upon removal of the assembly 12, as illustrated in FIG. 2, a drive shield 14 is removed from a engine housing 13 upon removal of conventional nuts that secure the shield 14 to threaded bosses 15. Subsequently, the conversion apparatus 10 is mounted to the available threaded bosses 15 through a plurality of boss mounting apertures 16 extending through a second portion 18 of the housing.

A drive member 19 of the apparatus includes a cylindrical sprocket drum 20 formed with an internal cavity provided with sprocket teeth 21 and recesses 22 to enable the cylindrical sprocket drum 20 to matingly engage a drive sprocket 23 of the chain saw 11. A through extending boss mounting apertures 16 are parallel to each other and parllel to the axis of the rotatable drive member 19. The drive member 19 is formed with a reduced diameter extension 24 extending through a first portion of the housing, as illustrated in FIG. 5, and terminates in a cylindrical auger mount 25 formed with a plurality of auger mounting pins 26 positioned through a plurality of through extending apertures within a forward portion of the auger mount 25.

A plurality of auger mount pins 27 replaceably secure the cylindrical auger mount 25 to the reduced diameter extension 24 by extending through respective flanges formed on the extension 24 and the auger mount 25, as illustrated in FIG. 5. In this manner, the auger mount 25 may be replaceably mounted to the assembly to accommodate wear of the auger mount 25 or replacement by auger mounts of various diameters to accommodate associated augers of various mounting diameters. A outer bearing 29 is positioned on one side of the housings first portion 17 with an inner bearing 30 mounted on the other side of the first portion 17 adjacent the sprocket drum 20. The outer bearing is formed with an extending flange that mounts a plurality of bearing fasteners 31 to secure the inner and outer bearing together and compressively secure a forward wall of the housing first portion 17 therebetween. A plurality of slots 32 are provided to enable the drive member 19 to be axially displaced relative to the housing second portion 18 to accommodate spacing variations between the threaded bosses 15 and a respective drive sprocket 23.

Accordingly once mounted to the chainsaw 11, the power chain saw ice auger conversion apparatus 10 may thereafter mount an auger 33 for boring through ice to gain access to fishing therebelow. It should be noted that the auger 33 is of a left-hand helical flight to accommodate the distinctive clockwise rotation of a chain saw sprocket 23.

It is noted that the first and second housing portions 17 and 18 are integrally formed to define a single generally elongate rectangular housing organization to be accommodated within the recess provided by the removal of the drive shield 14.

As to the manner of usage and operation of the instant invention, the same should be apparent from the above description. Accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An ice auger conversion apparatus for use in combination with a chain saw, said chain saw including, a drive sprocket and a plurality of spaced mounting bosses, said apparatus comprising, a unitary housing member including a first and second housing portion, said first housing portion rotatably mounting a drive means with said second housing portion including a plurality of through extending apertures for accepting said mounting bosses therethrough and mounting said housing member to said chain saw, and said drive means including a forward auger mount and an elongate auger mountable on said auger mount, and said drive means further includes a sprocket mounting means integrally formed to said drive means for operatively engaging said drive sprocket of said chain saw, and wherein said drive means further includes a cylindrical sprocket drum formed with an interior cavity wherein the inner surface of said drum is formed with a series of sprocket teeth and recesses in complementary configuration to the drive sprocket of said chain saw, and wherein said cylindrical sprocket drum includes a reduced diameter extension extending through said housing with an outer bearing positioned on one side of said housing and an inner bearing positioned on interior surface of said housing between said housing and said cylindrical sprocket drum, and wherein a cylindrical auger mount is removably mounted to said reduced diameter extension by a plurality of mounting pins securing said auger mount to said reduced diameter extension, and wherein said drive means further includes a plurality of bearing mount fasteners extending through said exterior bearing and said interior bearing to secure the bearings together and wherein the bearing mount fasteners are mounted within slots orthogonally adjustable relative to the axis of said drive means to vary the distance between the axis of said drive means and the through extending apertures formed within said second housing portion.

2. An ice auger conversion apparatus as set forth in claim 1 wherein the auger is of a left-hand helical flight configuration.

* * * * *